W. S. DENNETT.
Spoon-Holding Attachments.
No. 148,355. Patented March 10, 1874.
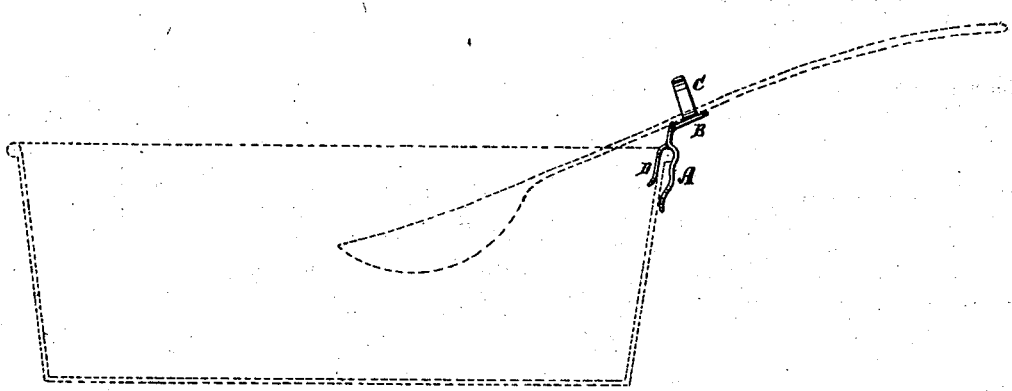
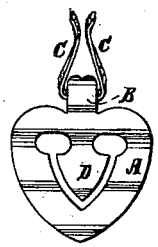
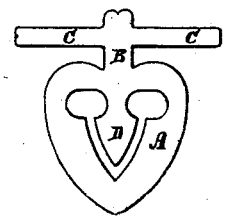
WITNESSES:
INVENTOR:
BY
ATTORNEYS.

UNITED STATES PATENT OFFICE.

WINFIELD S. DENNETT, OF SACO, MAINE.

IMPROVEMENT IN SPOON-HOLDING ATTACHMENTS.

Specification forming part of Letters Patent No. 148,355, dated March 10, 1874; application filed January 31, 1874.

*To all whom it may concern:*

Be it known that I, WINFIELD S. DENNETT, of Saco, in the county of York and State of Maine, have invented a new and Improved Spoon-Holding Attachments to Pans, of which the following is a specification:

My invention consists of a little spring-clip arranged to fasten on the upper edge of a pan or pot by springs, and hold a spoon by other springs, the said holder being made of sheet metal by stamping or cutting out a blank in dies and bending up the springs. The object is to provide a convenient means of holding a spoon used from time to time for mixing the contents of the pan so that it will not slide down into the pan while not in use, and thus save the cleaning of the spoon in order to lay it down after it is used.

Figure 1 is a front elevation of my improved spoon-holding clip; and Fig. 2 is a side elevation of it, also a side elevation of a spoon and a section of a pan in dotted lines; and Fig. 3 is a diagram of the blank of which the clip is to be made when cut out of the sheet, as before being bent.

Similar letters of reference indicate corresponding parts.

A is a small plate, of suitable size for the purpose for which it is intended, cut out of a sheet of brass or steel, together with the bar B and the cross-bar C, and, out of A, a little tongue, D, is partly cut. A and D are then bent so as to clip the upper edge of the basin, pan, or pot, and fasten upon it, as shown in Fig. 2, and B is bent backward, and the two parts of C are bent upward to receive and hold the spoon, as shown.

The bending may be effected immediately after the cutting of the blank from the sheet, by dies of suitable construction, or it may be done by one or more successive operations, as may be preferred.

The parts A B may be considerably modified in their form, and the number may be varied; for instance, they may either one or both be separated into two parts, if preferred.

Having thus described my invention, I claim as new and desire to secure by Letters Patent—

The elastic plate A, constructed with bar B, cross-bar C, and tongue D, bent, shaped, and applicable, as described, to form a new article of manufacture, for the purpose specified.

WINFIELD S. DENNETT.

Witnesses:
A. P. THAYER,
T. B. MOSHER.